E. OLSEN.
Clip for Rope-Tramways.

No. 168,522. Patented Oct. 5, 1875.

Witnesses
John Becker
Benj. W. Hoffman

Inventor:
E. Olsen
by his Attorneys
Brown & Allen

UNITED STATES PATENT OFFICE.

ENGELBRECHT OLSEN, OF JACOB CITY, UTAH TERRITORY.

IMPROVEMENT IN CLIPS FOR ROPE TRAMWAYS.

Specification forming part of Letters Patent No. 168,522, dated October 5, 1875; application filed July 1, 1875.

*To all whom it may concern:*

Be it known that I, ENGELBRECHT OLSEN, of Jacob City, in the county of Tooele and Territory of Utah, have invented an Improvement in Clips for Rope Tramways; and I do hereby declare that the following is a full, clear, and exact description of the same, reference being had to the accompanying drawing, which forms part of this specification.

My invention relates to a clip such as is used for suspending buckets or other vessels from a rope tramway. Such clips have heretofore been secured to the rope by means of rivets passed through what is known as the "lap," and when they become loose from the result of wear it is necessary to replace them by new ones.

My invention consists in a novel construction and combination of the clip and the shaft from which the bucket is suspended, whereby the clip is firmly held in position on the rope, the lap is readily tightened when necessary, and displacement of the parts is prevented.

Figure 1:
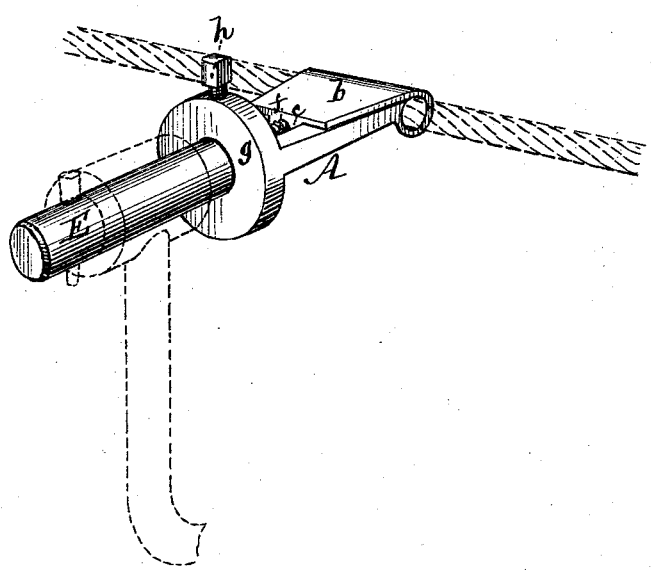
Figure 2:
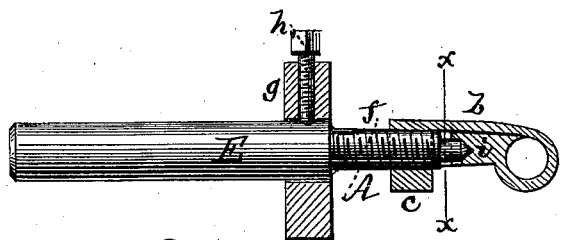
Figure 3:
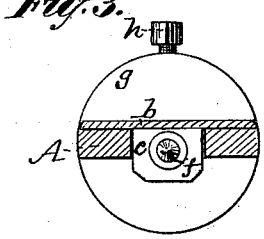

In the accompanying drawing, Figure 1 is a perspective view of my improved clip in the position in which it is attached to the rope. Fig. 2 is a partial longitudinal section of the clip. Fig. 3 is a transverse section taken in the line $x\,x$ of Fig. 2.

The clip A is constructed with a flat portion, $b$, which is bent upward and backward to form what is known as the lap, through which the rope of the tramway passes, in the manner indicated by dotted lines in Fig. 1. On the extreme end of the flat piece $b$, which forms the lap, is a lug or projection, $c$, bent downward, and lying in a slot in the body of the clip. This lug is provided with an internal screw-thread, and acts as a nut for engagement with a screw, $f$, formed on one end of the shaft E, from which the bucket is suspended by means of a hanger. (Shown in dotted lines in Fig. 1.) The shaft E passes through a collar, $g$, formed on the body of the clip, which collar has a set-screw, $h$, passing through it, and bearing against the shaft E. The point of the screw $f$ enters a recess, $i$, in the body of the clip; and said recess and the collar $g$ form two bearings, which prevent the possibility of lateral displacement of the lap.

The clip is attached to the rope of the tramway by passing said rope through the lap, as shown in dotted lines, and then turning the shaft E, so that the engagement of the screw $f$ with the nut $c$, and of the point of the screw with the recess $i$, will draw the end of the lap toward the collar $g$, and clamp the rope tightly in the lap. The set-screw $h$ is then tightened, so as to prevent the shaft E from turning. By this means the clip is held firmly in position on the rope, and displacement of the parts is rendered impossible. If the lap should become loose on the rope from the result of wear and hard usage, it may be readily tightened by loosening the set-screw $h$, tightening the screw $f$, and again tightening the set-screw.

What I claim as new, and desire to secure by Letters Patent, is—

1. The combination of the clip A, provided with the recess $i$, and having the nut or threaded lug $c$ on the end of the lap $b$, and the shaft E, provided with the screw $f$, substantially as and for the purpose shown and described.

2. The combination, with the shaft E, of the collar $g$ and set-screw $h$, substantially as shown and described.

ENGELBRECHT OLSEN.

Witnesses:
PETER SOVENSEN,
MARTIN WARD.